Patented Nov. 25, 1941

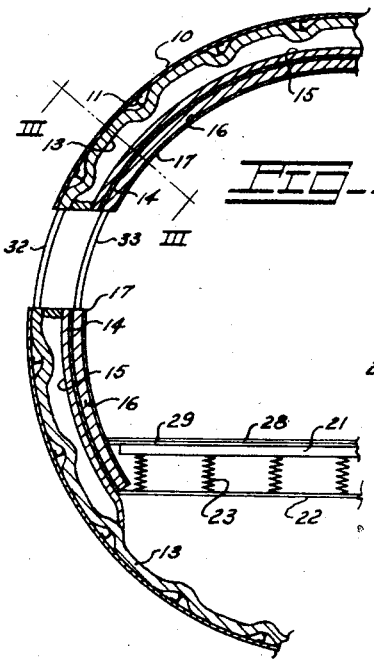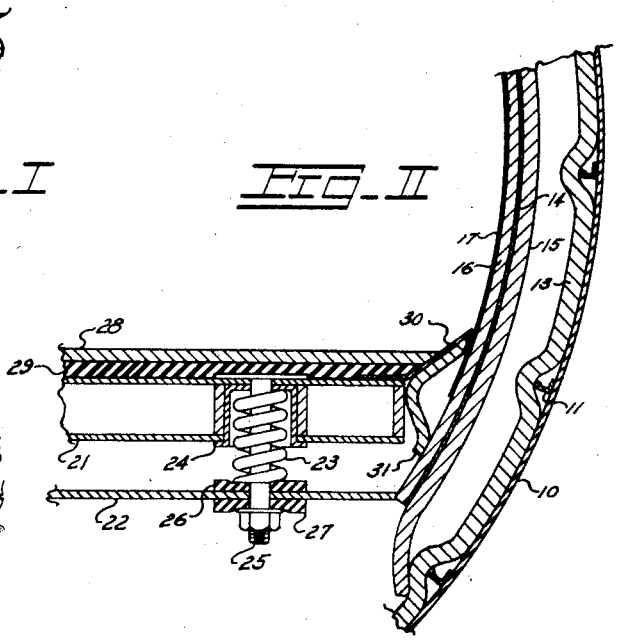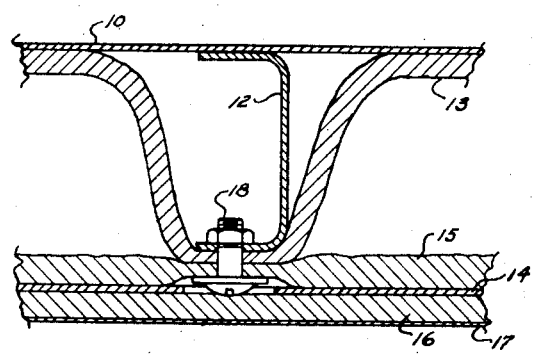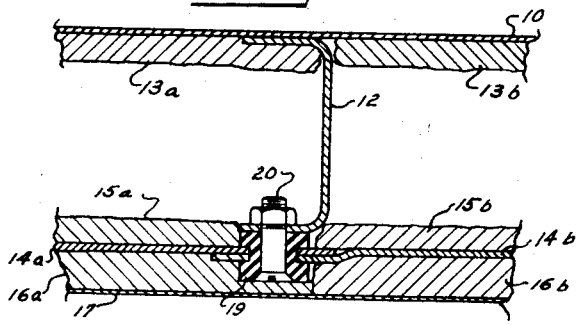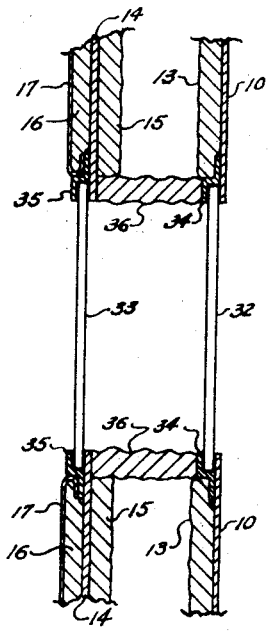

2,263,919

UNITED STATES PATENT OFFICE 2,263,919

SOUND AND VIBRATION INSULATION FOR AIRCRAFT CABINS

James B. Darragh, Jr., Burbank, Calif., assignor to Lockheed Aircraft Corporation, Burbank, Calif., a corporation of California Application October 21, 1939, Serial No. 300,573

8 Claims. (Cl. 20—4)

This invention relates to aircraft construction and more particularly to the construction of an aircraft fuselage or passenger cabin possessing improved insulating features such that the noise and vibration within the cabin are reduced to a much lower level than has heretofore been possible.

In order to meet the demands for comfort in aircraft transportation, it is not only necessary to provide the passengers with comfortably cushioned seats in an air-conditioned cabin but it is also necessary to reduce the noise and vibration within the cabin to a minimum. Such provision is essential both for ease of conversation and for satisfactory sleeping accommodations.

Since the weight of the structure is of utmost importance to aircraft, the methods of reducing noise and vibration must, of necessity, differ from those methods used in automobiles and other ground transportation facilities. Also, when it is considered that the intensity of the noise present in the best examples of sound insulated aircraft cabins is approximately double that present in an automobile, the difficulty of this problem and the need for a satisfactory solution will be readily appreciated.

Noise and vibration in aircraft cabins are from three major sources; namely, that which is carried through the structure; that which is carried by the air; and that which is carried by the ventilating system. For purposes of clarity, the first two means shall be termed structure borne noise and vibration and air borne noise and vibration respectively. This invention relates primarily to a means for reducing the noise and vibration within an aircraft cabin due to these two sources. The noise due to the third source, that is the ventilating system, is of small importance, and may be readily prevented by many known methods.

The structure borne noise and vibration which is primarily caused by the unbalance of engines and propellers, results in the vibration of the cabin walls, the floor panels and the windows, which in turn set up sound waves in the air. The air borne noise and vibration which is primarily caused by engine explosions, aerodynamic sounds and noise vibration of the tips of the propellers, is propagated through wave motion between the source and the cabin.

Considerable advancement has been made in the methods of insulating aircraft cabins against external noises and it is now possible to eliminate the major portion of same. Of the noise now present, it has been found that approximately 80% is due to structural vibration, that is, noise and vibration transmitted to the passenger cabin from the main load-carrying structure. It will be evident that any method which will eliminate or reduce the noise resulting from this source will produce a great reduction in the noise level within the cabin, and, when combined with a reduction in direct vibration will definitely increase passenger comfort.

The limiting factors in sound-proofing methods for aircraft are those of weight and space. It is evident that the most logical solution to this problem, that is, to eliminate the noise and vibration at its source, is a practical impossibility. However, vibration can be materially reduced by using very soft engine supports such as springs, etc., and dynamically balancing the engines and propellers as perfectly as possible. Such methods are generally known and are practiced to advantage in all modern aircraft designs.

I am aware that the art relating to this invention is considerable. For example, U. S. Patent No. 2,111,326 shows an acoustical treatment for walls which can be applied to aircraft construction. The teachings of this patent disclose an aircraft cabin comprised of an inner and outer shell, the inner shell being supported by the cabin floor only. Appreciating its value to the art, I, nevertheless, know that the treatment disclosed will not satisfactorily solve the present problem and that certain additional features are definitely necessary to create an effective acoustical treatment for aircraft cabins. It is evident that the floor structure must be acoustically treated to the same extent as the wall structure, and, further, that all windows and/or openings must be so constructed or treated as to practically eliminate any noise or vibration from these sources. My invention improves over this patent in that the inner shell is resiliently attached to the outer shell around its circumference and is isolated therefrom insofar as vibration is concerned. This construction allows sufficient lateral and longitudinal movement of the inner cabin, while at the same time providing adequate restraint during up-loads and side-loads. Thus, the insulated cabin construction which I have invented possesses many advantages and improvements over that shown in the above patent.

It is, therefore, the main object of this invention to provide a means for reducing the noise due to vibration by providing a resiliently mounted internal cabin completely insulated from the outside load carrying structure.

Another object of this invention is the provision of improved sound insulating methods applicable to aircraft cabin construction.

Still another object of this invention is the provision of a method of aircraft window construction which will practically eliminate all noise from that source.

The above and other objects of the invention will be made more apparent throughout the following detailed description of the accompanying drawing, wherein like reference characters refer to like parts, and wherein:

Figure I is a sectional view of an aircraft cabin constructed in accordance with my invention.

Figure II is a sectional view showing in detail what I now consider to be the preferred method of resiliently mounting the floor structure.

Figure III is an enlarged sectional view as indicated by the line III—III of Figure I and shows one method of resiliently attaching the inner cabin to the outer load carrying structure.

Figure IV shows an alternate method of attaching the inner shell to the outer load carrying structure.

Figure V is a sectional view showing the essential details of my preferred window construction.

In the drawing, which illustrates an aircraft cabin insulated against noise and vibration in accordance with my invention, the main load carrying structure, hereinafter sometimes referred to as the outer shell, comprised of an exterior wall or skin 10, longitudinal stringers 11 and transverse contour forming rings 12, is provided, for the purpose of lessening vibration, with an interior lining of relatively thick porous material 13. It will be understood that the porous lining 13 will not lessen the vibration of the load carrying structure as a whole but will, nevertheless, prevent a great amount of local vibration; that is, the vibration of the skin panels obviously formed by the intersecting of the longitudinal stringers 11 and the contour forming rings 12. It will also be understood that other types of structure, depending on their sensitivity to vibration, may or may not require the use of an inner lining 13 as included in the embodiment shown. This lining 13 is preferably attached to the interior surface of said outer shell by means of an adhesive capable of withstanding a great amount of vibration, and, if maximum efficiency is to be expected, the portion of the outer shell below the floor should also be lined.

Spaced inwardly from the exterior skin 10 is an inner shell comprised of a sheet of pliable material 14 such as aluminum alloy or thin plywood, to the outer and inner surfaces of which are cemented layers 15 and 16 of soft porous material. The inner shell thus formed may also be provided with a decorative lining 17, stitched at intervals or otherwise attached to the layer of porous material 16. The decorative lining 17 may be of cloth, leather or any other suitable material applicable to this purpose. This inner shell which forms the walls and roof of the cabin proper is suspended from the outer shell by any means incapable of transmitting vibration.

Two preferred methods of resiliently mounting the inner shell are shown in Figures III and IV. In Figure III bolts 18 extending through the outer layer 15 only, resiliently attach the inner shell to the rings 12. The lining 13, being continuous over said rings 12, provides additional resistance to vibration. Since the entire weight of the inner shell is supported by the layer of porous material 15, many installations may require reinforcement, such as sewed-on patches of cloth, in the region of the attachment.

Figure IV shows another type of resilient attachment in which a grommet 19, preferably of soft rubber, provides adequate resistance or insulation against vibration. A bolt 20, through the grommet 19 and the ring 12, completes the attachment. When mountings of this type are used, the lining 13 might well consist of sections 13a, 13b, etc., terminating at each side of the transverse rings 12, as shown by the drawing. Also, the inner shell 14 will be broken into panels 14a and 14b, together with its associated layers of porous material 15a and 15b and 16a and 16b, etc.

Since the drawing illustrating my preferred means for resiliently mounting the inner shell will be readily understood by those skilled in the art, it is not deemed necessary to continue with further detailed description. Suffice it to say that any means capable of preventing the vibrations of the outer shell from being transmitted to the sheet 14, will be suitable for this purpose. It will, of course, be understood that, in order to adequately support the inner shell, a series of such resilient mountings should extend circumferentially along each of said contour rings.

If the noise level within the cabin is to be effectively decreased, it will be necessary, in addition to the foregoing precautions and construction, to prevent the vibrations of the load carrying structure from being transmitted to the cabin floor, and also to provide the floor with an acoustical treatment capable of preventing air borne noise from entering the cabin by that path. Accordingly, in Figure II I have shown in detail a method for resiliently mounting the floor 21 upon the floor support structure 22 by means of the interposed spring elements 23. The floor support structure 22 may form part of the structural frame supporting the skin 10, resting on and fastened to transverse beams, or longitudinal stringers, as is common practice in skin stressed all-metal aircraft. The spring elements 23 should be as soft as practical considerations, such as loads and maximum deflection under the loads, will permit. Such design will result in a low natural frequency and will insure adequate resistance to vibration under all operating conditions. The reaction of each spring element 23 is adequately distributed to the floor 21 by means of a recessed cup 24, however, it will be understood that other means may be readily employed for this purpose.

Since aircraft are subjected to down-draft and other conditions producing inertia factors in the upward direction, it is necessary to provide suitable safeguards to restrain the floor against excessive vertical movement. The safety bolts 25 extending through the floor 21 and supporting structure 22 will prevent vertical displacement of the floor 21 and will in no way interfere with the efficient action of the spring elements 23. Noise, due to vibratory contact of the safety bolts 25 with the supporting structure 22, is prevented by cementing washers 26 and 27 of rubber, felt or other soft material to said supporting structure 22 in the manner shown.

As insulation against air borne noise the floor 21 is provided with a covering of carpet material 28 and an interposed padding 29 of soft foam rubber or other porous material. The carpet 28 and padding 29 not only serve to exclude air borne noise but also, as previously explained with regard to the lining 13, serve to prevent local vibration of the floor panels. Accordingly, the carpet 28 and padding 29 are preferably cemented or otherwise attached to said floor 21 in a manner such that transmission of vibrations is prevented. Scuff strips 30 disposed along the edges of the floor 21 prevent the passengers from marring the decorative lining 17 with their shoes. Seal strips 31 also disposed along the edges of the floor 21 are cemented to both the scuff strip 30 and porous material 16, complete the floor acoustical treatment.

In Figure V I have shown the essential details of my preferred window construction which consists of a plurality of panes 32 and 33 mounted to the skin 10 of the outer shell and sheet 14 of the inner shell respectively by means of the clamps 34 and 35. The panes 32 and 33 are preferably of dissimilar material or of material of different thickness so as not to have the same natural frequency and thus cause resonance. Spacing strips 36 disposed around the edges of the panes 32 and 33 intermediate the inner and outer shells not only enhance the appearance of the installation but also provide a certain amount of resistance to vibration. It is very important that the air space between the panes 32 and 33 not be completely confined, in that, any vibration of the outer pane 32 would be transmitted to the inner pane 33 and would thus result in a source of noise. Furthermore, it is desirable to have a circulation of air to evaporate any moisture which if allowed to condense on the panes 32 and 33 would obstruct visability. Thus the spacing strips 36 may be of any soft porous material substantially non-resistant to the passage of air and having the desired decorative qualities.

The insulating materials indicated as porous in the foregoing description may, for example, comprise Seaman felted kapok batt, glass wool, rock wool, or other suitable types of felted or blanket insulation.

Realizing, however, that conditions concurrent with the adoption of this invention may later be varied to a considerable extent, it is desired to emphasize the fact that corresponding alterations in the reduction of the invention to practice may later be resorted to in a manner limited only by just interpretation of the spirit and scope of the appended claims.

What I claim is:

1. In an aircraft cabin, the combination of an outer shell, a layer of insulating material attached to the interior surface of said outer shell, a spaced inner shell comprising a sheet of thin, pliable material and a plurality of layers of insulating material, and a means for resiliently suspending said inner shell from said outer shell comprising a plurality of attaching means engaging and clamping at least one layer of the insulating material without contacting the pliable material.

2. In an aircraft cabin, the combination of an outer shell, a lining of relatively thick, soft, porous material attached to the interior surface of said outer shell, an inner shell comprising a sheet of thin, pliable material and a plurality of layers of relatively thick, soft, porous material, said inner shell being resiliently suspended in spaced relation from said outer shell, dual pane windows disposed in the sides of said cabin, one of said panes being supported by the outer shell and the other of said panes being supported by said resiliently suspended inner shell.

3. In an aircraft cabin, the combination of an outer shell comprising a covering of relatively thin material supported upon a framework of spaced longitudinal and transverse members, a layer of insulating material attached to the interior surface of said outer shell, an inner shell spaced from said outer shell and comprising a sheet of thin, pliable material to the inner and outer surfaces of which are attached layers of insulating material and resilient suspending means for said inner shell comprising a plurality of mounting means supported on said framework and engaging said insulating material.

4. In an aircraft cabin, the combination of an outer shell comprising a covering of relatively thin material supported upon a framework of spaced longitudinal and transverse members, a layer of relatively thick, soft, porous material attached to the interior surface of said outer shell, an inner shell comprising a sheet of thin, pliable material to the inner and outer surfaces of which are attached a plurality of layers of thick, soft, porous material, a means for resiliently suspending said inner shell from said outer shell, dual pane windows disposed in the sides of said cabin, one of said panes being supported by said resiliently suspended inner shell, a floor supporting structure extending transversely of and integral with said outer shell, a cabin floor, a covering for said floor comprising a layer of insulating material and a carpet, a plurality of resilient elements intermediate said floor and said floor supporting structure, and a means for restraining said floor to prevent excessive vertical movement thereof.

5. In an aircraft cabin, the combination of an outer shell comprising a covering of relatively thin material supported upon a framework, a layer of relatively thick, soft, porous material attached to the interior surface of said outer shell, an inner shell comprising a sheet of thin, pliable material and a plurality of layers of relatively thick, soft, porous material, a means for resiliently suspending said inner shell from said outer shell, a floor supporting structure extending transversely of and integral with said outer shell, a cabin floor, a covering for said floor comprising a layer of insulating material and a protective covering, a plurality of spring elements intermediate said floor and said floor supporting structure, and a means for restraining said floor to prevent excessive vertical movement thereof.

6. In an insulated cabin for aircraft, the combination of an outer shell comprised of a covering of thin metal sheet supported upon a framework of spaced longitudinal and transverse members, a layer of relatively thick, porous material attached to the interior surface of said outer shell and extending to substantially cover said framework, an inner shell comprised of a sheet of thin, pliable material and a plurality of layers of relatively thick, porous material, said porous material being attached to the inner and outer surfaces of said pliable material, said inner shell being resiliently suspended from the transverse members of said outer shell.

7. In an aircraft cabin including spaced outer and inner shells mounted for relative shock and sound absorbing movement, dual paned windows in said shells comprising an outer pane conforming to the profile of the outer shell, and an inner pane having a different vibration response, said inner pane being mounted in and supported by the inner shell independently of the outer pane, the space between the inner and outer panes not being completely confined.

8. In an aircraft cabin including spaced outer and inner resiliently connected shells, dual paned windows in said shells comprising an outer pane conforming to the profile of the outer shell, and an inner pane mounted in and supported by the inner shell independently of the outer pane.

JAMES E. DARRACH, Jr.